June 7, 1938.  J. BUGATTI  2,120,016
CONNECTING ROD
Filed July 15, 1936
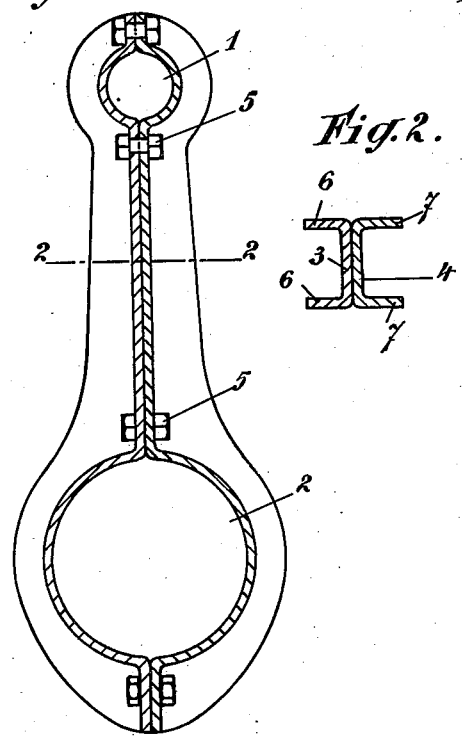
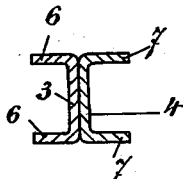
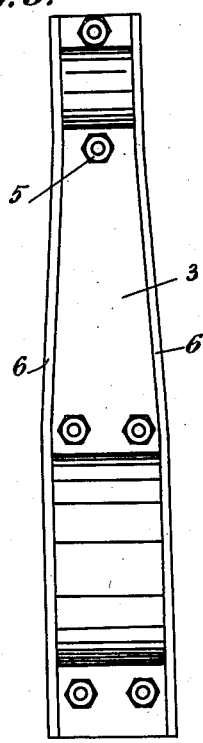
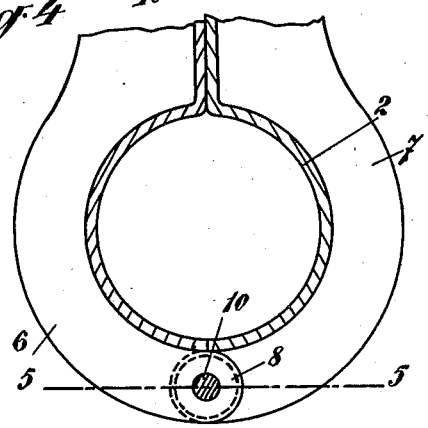
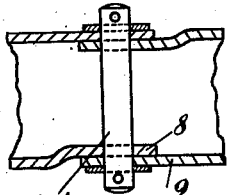
Inventor:
Jean Bugatti
By Mauro + Lewis
Attorneys Patented June 7, 1938

2,120,016

UNITED STATES PATENT OFFICE 2,120,016

CONNECTING ROD

Jean Bugatti, Molsheim, France

Application July 15, 1936, Serial No. 90,815
In France August 19, 1935

4 Claims. (Cl. 74—588)

My invention relates to connecting rods for engines and the like, including main rods for locomotives. An object of this invention is to provide a connecting rod which is of comparative lightness, while being adequately strong, and is economical in that it lends itself to manufacture in large numbers for the main part by presswork; another object is to provide an improved connecting rod having wide applicability, for example for automobile engines, aero engines, racing engines for special automobiles, locomotives and agricultural machinery.

According to the invention in its broadest aspect, a connecting rod is constituted essentially by assembling complementary pressings or like formed shapes of sheet metal, for example sheet steel or duralumin, which are so formed that their ends after assembly constitute big and small ends, whether of split or cap form, capable of receiving appropriate bearings, for example bushes or roller or like bearings. The shapes, which are in the described examples two in number, are assembled by uniting them by appropriate means so that they are juxtaposed in a plane containing the longitudinal axis of the rod, and this plane advantageously also includes the axes of the bearings. Assembly may be by bolts situated in appropriate positions, by welding, or by smooth pins located in holes in the parts, or any such means or their equivalents in combination. One particular interattachment according to the invention consists in the provision of cars on one or both parts which form in effect lap joints either with corresponding cars of the other part, or flanges thereof. A preferred embodiment of the invention consists of two U-sectioned sheet metal pressings interattached throughout their length by bolts through the bases of the U-sections and so shaped that when assembled encircling small and big ends are provided, which are subsequently fitted with bearings.

The invention is described in two forms in relation to the accompanying drawing by way of example. In this drawing:

Figure 1 is a longitudinal section of the connecting rod in one of its forms of embodiment;

Figure 2 is a section on 2—2 of Figure 1;

Figure 3 is a view in outline of the connecting rod;

Figure 4 represents, in the same conditions as Figure 1, a portion of a slightly different connecting rod; and Figure 5 is a section on 5—5 of Figure 4.

In the selected example, each of the two constituent parts of the connecting rod comprises a sheet-metal pressing of U section (Figure 2). The ends are appropriately and symmetrically curved in to constitute the big end 2 and the small end 1. The pressings are assembled by the bases 3, 4, of the U-sections, for example by means of bolts 5; the flanges 6, 7, of the U-sections form in the connecting rod stiffening ribs which render it rigid against deformation. After assembly the big end 2 and small end 1 may be machined for the reception of bearings.

As is indicated on the drawing, the breadth and/or the depth of the U-sections may be varied along the shapes whenever that is advantageous or necessary; where U-sections are employed, the result may be a cross section in H form.

In the modification of Figures 4 and 5 the flanges 6, 7 of the pressings are prolonged in such a way that they are overlapped in assembly. The ears 8, 9 are transfixed by an assembling pin 10 which is for example a smooth pin and which may be located by washers and pins or by any other appropriate means.

It is to be understood that this mode of connection may be adopted alone or in combination with that which was described in reference to Figures 1 and 2, and one may provide it in any appropriate location.

There may be introduced modifications of detail of the connecting rods which have been described without thereby departing from the scope of the present invention.

What I claim is:

1. A connecting rod which comprises, in combination, two U-section elements having the bases of the U sections assembled along a plane passing substantially through the longitudinal axis of the rod and transverse to the plane of movement of said rod, whereby the resultant section of the whole is a H section, said respective elements including parts which overlap one another in a direction parallel to the plane of movement of said rod, and pins extending through said overlapping parts, for securing said sectional elements together.

2. In a connecting rod which comprises a shank portion including channel members having juxtaposed webs and flanges projecting on either side of the juxtaposed web assembly, the combination of channel extensions each integral with one of the channel members, complementarily shaped to form a pin bearing housing and having their respective flanges arranged to overlap at a point remote from said shank portion, with transfixing means for holding said flanges together at said point.

3. A dismountable connecting rod including a shank portion, bearing portions at each end of the shank portion and tip portions beyond the respective bearing portions with respect to the shank portion, which comprises in combination two channel members having their webs disposed in contacting relation in the shank portion and in the tip portions, in a plane at right angles to the plane in which the rod is to operate, and their flanges projecting on either side of the web assembly, the channel members being oppositely curved in the bearing portions to form housings for accommodating pin bearings; and detachable means for securing the channel members together, both in the shank portion and in the tip portions.

4. A dismountable connecting rod which consists of two U-section members the webs of which are rectilinear in the shank portion of the rod, are oppositely curved at both ends of the shank portion to form pin bearing housings, and have their respective ends in abutting relation, while their respective flanges project outwardly in opposite direction throughout the length of the webs and meet the flanges of the companion member at the ends of the rod; and detachable means for securing the channel members together through their webs in the shank portion and through their flanges at the end portions of the rod.

JEAN BUGATTI.